(12) United States Patent
Reed, Jr.

(10) Patent No.: US 6,182,383 B1
(45) Date of Patent: Feb. 6, 2001

(54) SNOW BLOWER CONVERTER KIT FOR COLLECTING LEAVES

(76) Inventor: Robert E. Reed, Jr., 900 Brisbin St., Houtzdale, PA (US) 16651

( * ) Notice: Under 35 U.S.C. 154(b), the term of this patent shall be extended for 0 days.

(21) Appl. No.: 09/311,405

(22) Filed: May 13, 1999

(51) Int. Cl.[7] .................................................. E01H 6/00
(52) U.S. Cl. ................................. 37/242; 37/252; 56/2; 56/16.9; 15/340.2
(58) Field of Search .............................. 37/241, 242, 243, 37/244, 246, 248, 249, 251, 252, 466; 56/16.4 R, 16.9, 12.8, 12.9, 13.1, 13.2, 13.3, 13.4, 17.5, 202, 2; 15/340.2

(56) References Cited

U.S. PATENT DOCUMENTS

| | | | | |
|---|---|---|---|---|
| Re. 29,139 | * | 2/1977 | Messner | 56/13.1 |
| 4,064,679 | * | 12/1977 | Spinner | 56/2 |
| 4,308,676 | * | 1/1982 | Doane | 37/243 |
| 4,597,203 | * | 7/1986 | Middleton | 37/241 |
| 4,679,338 | * | 7/1987 | Middleton | 37/244 |
| 5,090,142 | * | 2/1992 | Peters | 37/243 |
| 5,438,770 | * | 8/1995 | Miller | 37/227 |

* cited by examiner

Primary Examiner—Victor Batson

(57) ABSTRACT

A snow blower converter kit is provided for use with a snow blower. Such kit includes a mulcher blade and a squirrel cage adapted for being removably mounted on a drive shaft of the snow blower in concentric relationship between the conduit and the tines of the snow blower. Also included is a cover adapted for being removably mounted on the shield with a slot formed in a lower portion thereof for accepting leaves and the like therethrough.

5 Claims, 3 Drawing Sheets

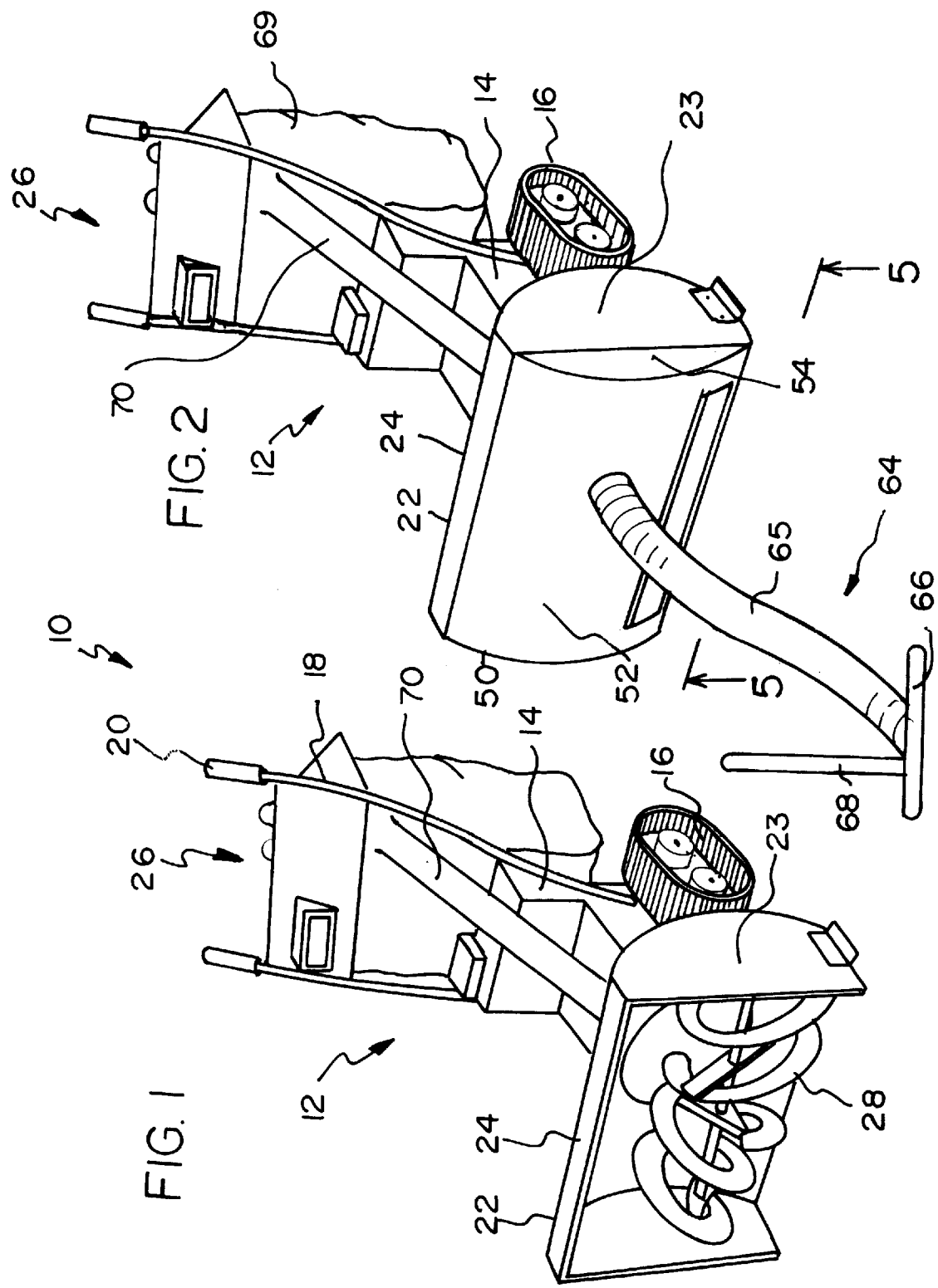

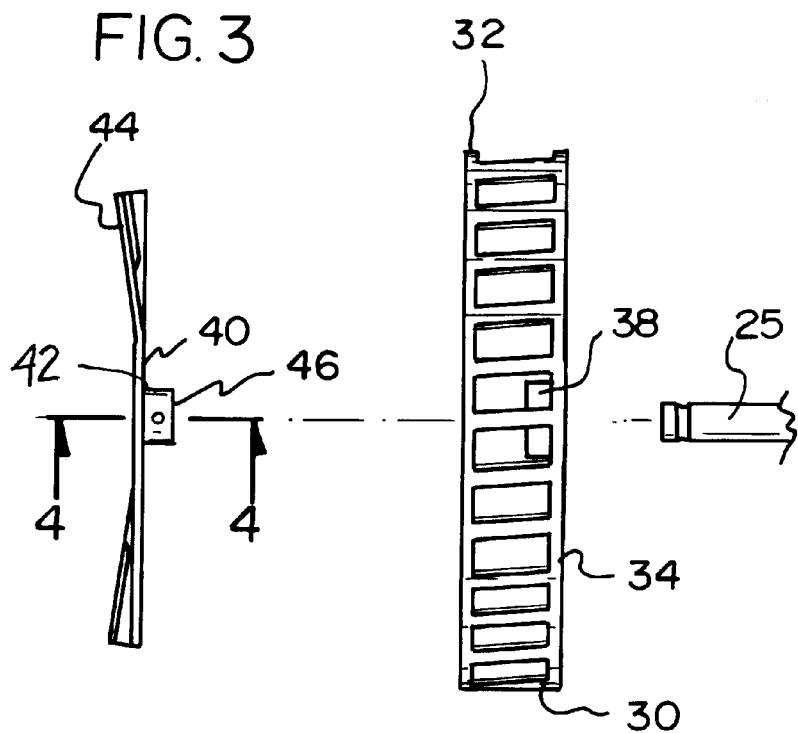
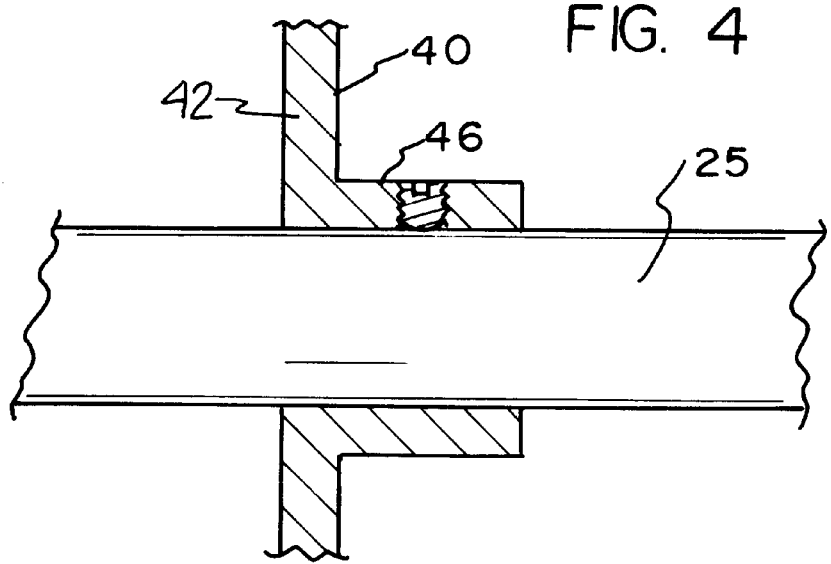

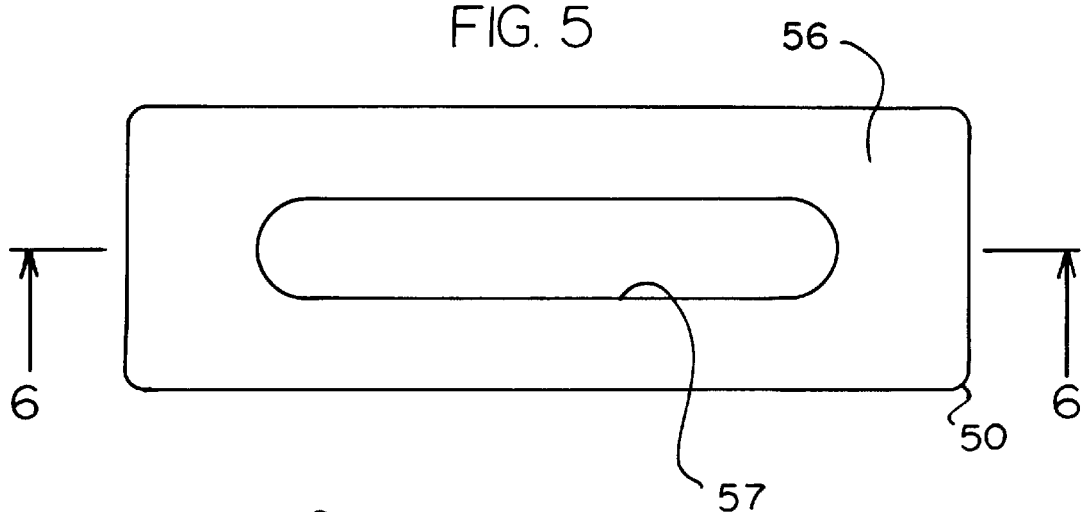
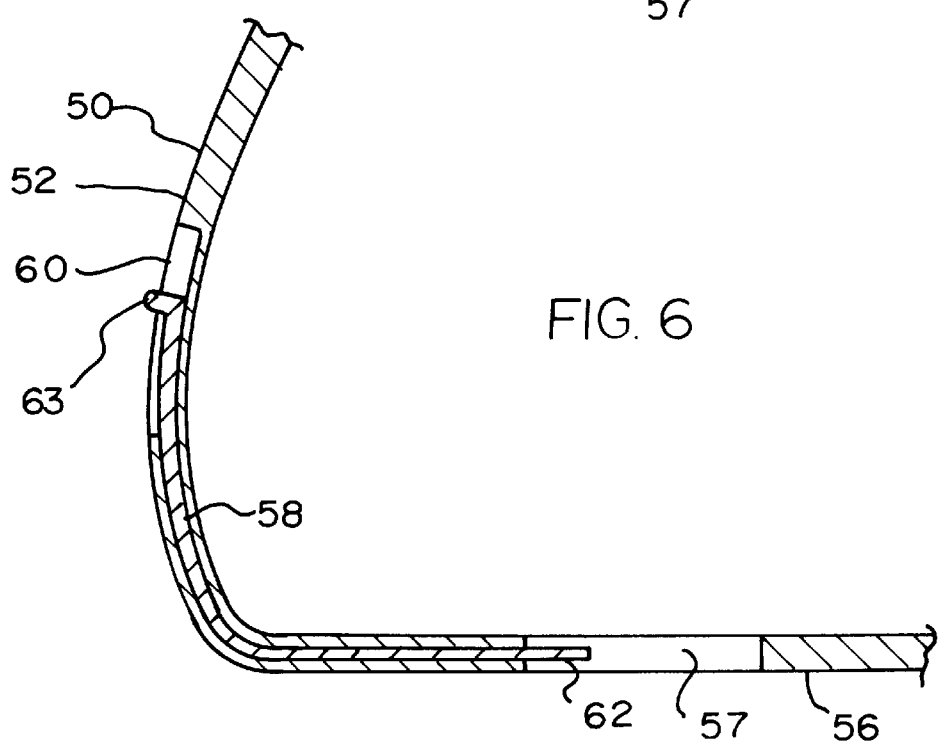
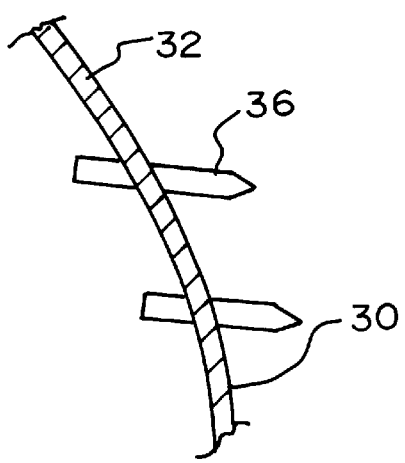

SNOW BLOWER CONVERTER KIT FOR COLLECTING LEAVES

BACKGROUND OF THE INVENTION

1. Field of the Invention

The present invention relates to snow blowers and more particularly pertains to a new snow blower converter kit for allowing the dual use of a snow blower as a leaf collector.

2. Description of the Prior Art

The use of snow blowers is known in the prior art. More specifically, snow blowers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,597,203; U.S. Pat. No. 5,090,142; U.S. Pat. No. 4,064,679; U.S. Pat. No. 4,294,027; U.S. Pat. Des. 307,912; and U.S. Pat. No. 3,200,519.

In these respects, the snow blower converter kit for collecting leaves according to the present invention substantially departs from the conventional concepts and designs of the prior art, and in so doing provides an apparatus primarily developed for the purpose of allowing the dual use of a snow blower as a leaf collector.

SUMMARY OF THE INVENTION

In view of the foregoing disadvantages inherent in the known types of snow blowers now present in the prior art, the present invention provides a new snow blower converter kit for collecting leaves construction wherein the same can be utilized for allowing the dual use of a snow blower as a leaf collector.

The general purpose of the present invention, which will be described subsequently in greater detail, is to provide a new snow blower converter kit for collecting leaves which has many of the advantages of the snow blowers mentioned heretofore and many novel features that result in a new snow blower converter kit for collecting leaves which is not anticipated, rendered obvious, suggested, or even implied by any of the prior art snow blowers, either alone or in any combination thereof.

To attain this, the present invention is adapted for use with a snow blower having an intermediate motor assembly including a pair of tracks mounted on opposite side faces thereof. Also bars coupled to the side faces of the intermediate motor assembly and extending upwardly and rearwardly therefrom. As shown in FIGS. 1 & 2, handle grips are positioned on top ends of the handle bars. A shield includes a rear face with a semi-cylindrical configuration mounted to a front face of the intermediate motor assembly. Further, the shield is equipped with a pair of semicircular side faces. As such, an open front and an open bottom are defined, as shown in FIG. 1. A drive shaft is coupled to the intermediate motor assembly and extends forwardly therefrom through the shield. A control assembly is mounted between the top ends of the handle bars for selectively rotating the drive shaft at a selected speed and controlling the tracks. FIG. 1 depicts a plurality of tines mounted on a cross bar which is rotatably positioned between the side faces of the shield. The tines are operatively coupled to the drive shaft for rotating coincidentally therewith. A first opening is formed in the front face of the intermediate motor assembly which is in communication with a second opening formed in a top face of the intermediate motor assembly. As such, material may be collected by the tines and directed from the first opening to the second opening. The present invention includes a squirrel cage having an annular ring with a periphery which has a plurality of rectangular cut outs formed therein each of which is defined by a pair of elongated side edges and a pair of short end edges. As shown in FIG. 7, a plurality of planar rectangular blades are each integrally coupled along a central extent thereof to one of the elongated side edges of one of the cut outs. By this coupling, outboard sharpened edges of the blades are angled outwardly. The squirrel cage includes a central sleeve connector with a radially extending set screw for allowing the square cage to be removably connected to the drive shaft in concentric relationship therewith. Ideally, the squirrel cage is positioned between the shield and the tines of the snow blower. FIG. 3 shows a mulcher blade including an elongated planar rectangular strip. This strip is equipped with a pair of opposing elongated sharpened edges which flare outwardly in opposite directions. The mulcher blade has a central sleeve connector with a radially extending set screw for allowing the mulcher blade to be removably connected to the drive shaft in concentric relationship. In the preferred embodiment, the mulcher blade is positioned between the squirrel cage and the tines of the snow blower during use. With reference now to FIGS. 2, 5 and 6, a cover is provided including a front face with a semi-cylindrical configuration and a pair of semicircular side faces. The cover further includes a horizontally oriented planar rectangular lower lip integrally coupled along a lower edge of the front face of the cover. In use, the cover serves for being removably attached to the shield for completing enclosing the tines. As shown in FIG. 5, the lower lip has an elongated opening formed along a length thereof. The cover further includes a hollow interior formed between a front surface and a rear surface of the front face and lower lip. As shown in FIG. 6, such interior remains in communication with a slot formed in the front surface of the front face of the cover and further in communication with the opening of the lower lip. By this structure, a flexible shutter is slidably mounted within the hollow interior of the cover. An upper tab of the shutter extends from the slot for allowing a user to selectively close the opening formed in the lower lip of the cover for reasons that will soon become apparent. Figure depicts a vacuum assembly including a bellowed hose. This hose has a first end removably coupled to a bore formed in a central extent of the front face of the cover. A second end of the hose is equipped with an elongated laterally extending inlet mounted thereon. An elongated linear handle is fixedly mounted on the inlet and extends upwardly therefrom for maneuvering by a user. Finally, a bag is removably mounted below the control assembly of the snow blower. A pipe is connected between an upper extent of a front face of the bag and the second opening of the snow blower. The pipe thus serves for receiving and storing the material received therefrom.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new snow blower converter kit for collecting leaves apparatus and method which has many of the advantages of the snow blowers mentioned heretofore and many novel features that result in a new snow blower converter kit for collecting leaves which is not anticipated, rendered obvious, suggested, or even implied by any of the prior art snow blowers, either alone or in any combination thereof.

It is another object of the present invention to provide a new snow blower converter kit for collecting leaves which may be easily and efficiently manufactured and marketed.

It is a further object of the present invention to provide a new snow blower converter kit for collecting leaves which is of a durable and reliable construction.

An even further object of the present invention is to provide a new snow blower converter kit for collecting leaves which is susceptible of a low cost of manufacture with regard to both materials and labor, and which accordingly is then susceptible of low prices of sale to the consuming public, thereby making such snow blower converter kit for collecting leaves economically available to the buying public.

Still yet another object of the present invention is to provide a new snow blower converter kit for collecting leaves which provides in the apparatuses and methods of the prior art some of the advantages thereof, while simultaneously overcoming some of the disadvantages normally associated therewith.

Still another object of the present invention is to provide a new snow blower converter kit for collecting leaves for allowing the dual use of a snow blower as a leaf collector.

Even still another object of the present invention is to provide a new snow blower converter kit for use with a snow blower. Such kit includes a mulcher blade and a squirrel cage adapted for being removably mounted on a drive shaft of the snow blower in concentric relationship between the conduit and the tines of the snow blower. Also included is a cover adapted for being removably mounted on the shield with a slot formed in a lower portion thereof for accepting leaves and the like therethrough.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new snow blower converter kit for collecting leaves according to the present invention with the cover removed.

FIG. 2 is a perspective view of the present invention with the cover and vacuum assembly in place.

FIG. 3 is a side exploded view of the drive shaft, mulcher blade, and squirrel cage of the present invention.

FIG. 4 is a side cross-sectional view of the central sleeve of the mulcher blade of the present invention.

FIG. 5 is a bottom view of the cover of the present invention showing the slot thereof.

FIG. 6 is a side cross-sectional view of the cover of the present invention taken along line 6—6 shown in FIG. 5.

FIG. 7 is a side cross-sectional view of the squirrel cage assembly of the present invention taken along line 7—7 shown in FIG. 3.

DESCRIPTION OF THE PREFERRED EMBODIMENT

With reference now to the drawings, and in particular to FIGS. 1 through 7 thereof, a new snow blower converter kit for collecting leaves embodying the principles and concepts of the present invention and generally designated by the reference numeral 10 will be described.

The present invention, designated as numeral 10, includes a snow blower 12 having an intermediate motor assembly 14 including a pair of tracks 16 mounted on opposite side faces thereof. Also included is a pair of handles bars 18 coupled to the side faces of the intermediate motor assembly and extending upwardly and rearwardly therefrom. As shown in FIGS. 1 & 2, handle grips 20 are positioned on top ends of the handle bars. A shield 22 includes a rear face 24 with a semi-cylindrical configuration mounted to a front face of the intermediate motor assembly. Further, the shield is equipped with a pair of semicircular side faces 23. As such, an open front and an open bottom are defined, as shown in FIG. 1.

A drive shaft 25 is coupled to the intermediate motor assembly and extends forwardly therefrom through the shield. A control assembly 26 is mounted between the top ends of the handle bars for selectively rotating the drive shaft at a selected speed and controlling the tracks. FIG. 1 depicts a plurality of tines 28 mounted on a cross bar which is rotatably positioned between the side faces of the shield. The tines are operatively coupled to the drive shaft for rotating coincidentally therewith. A first opening is formed in the front face of the intermediate motor assembly which is in communication with a second opening formed in a top surface of the intermediate motor assembly. As such, material may be collected by the tines and directed from the first opening to the second opening. Such material may take the form of snow, leaves or mulch. It should be noted that the foregoing snow blower is conventional and clearly set forth in CUB CADET TM snow blower model number 724TE and 926TE as set forth in the owner's manual thereof which is incorporated herein by reference.

The present invention includes a squirrel cage 30 having an annular ring 32 with a periphery which has a plurality of rectangular cut outs 34 formed therein each of which is defined by a pair of elongated side edges and a pair of short end edges. As shown in FIG. 7, a plurality of planar rectangular blades 36 are each integrally coupled along a central extent thereof to one of the elongated side edges of one of the cut outs. By this coupling, outboard sharpened edges of the blades are angled outwardly. The squirrel cage includes a central sleeve connector 38 with a radially extending set screw for allowing the square cage to be removably connected to the drive shaft in concentric relationship therewith. Such sleeve connector is preferably connected to the annular ring by way of radially extending supports or the like. Ideally, the squirrel cage is positioned between the shield and the tines of the snow blower. It should be noted that the second stage snow thrower of the snow blower is removed prior to the installation of the squirrel cage.

FIG. 3 shows a mulcher blade 40 including an elongated planar rectangular strip 42. This strip is equipped with a pair of opposing elongated sharpened edges 44 which flare outwardly in opposite directions. The mulcher blade has a central sleeve 46 connector with a radially extending set screw for allowing the mulcher blade to be removably connected to the drive shaft in concentric relationship. In the preferred embodiment, the mulcher blade is positioned between the squirrel cage and the tines of the snow blower during use. In use, the mulcher blade works in conjunction with the squirrel cage to afford a vacuum at the first opening of the intermediate motor assembly.

With reference now to FIGS. 2, 5 and 6, a cover 50 is provided including a front face 52 with a semi-cylindrical configuration and a pair of semicircular side faces 54. The cover further includes a horizontally oriented planar rectangular lower lip 56 integrally coupled along a lower edge of the front face of the cover. In use, the cover serves for being removably attached to the shield for completing enclosing the tines. As shown in FIG. 5, the lower lip has an elongated opening 57 formed along a length thereof.

The cover further includes a hollow interior 58 formed between a front surface and a rear surface of the front face and lower lip. As shown in FIG. 6, such interior remains in communication with a slot 60 formed in the front surface of the front face of the cover and further in communication with the opening of the lower lip. By this structure, a flexible shutter 62 may be slidably mounted within the hollow interior of the cover. An upper tab 63 of the shutter extends from the slot for allowing a user to selectively close the opening formed in the lower lip of the cover for reasons that will soon become apparent.

FIG. 2 depicts a vacuum assembly 64 including a bellowed hose 65. This hose has a first end removably coupled to a bore formed in a central extent of the front face of the cover. A second end of the hose is equipped with an elongated laterally extending inlet 66 mounted thereon. An elongated linear handle 68 is fixedly mounted on the inlet and extends upwardly therefrom for maneuvering by a user. As an option, the shutter may be used to close the cover thereby effecting optimal vacuum through the vacuum assembly. When the vacuum assembly is not in use, the bore of the cover may be capped.

Finally, a bag 69 is removably mounted below the control assembly of the snow blower. A pipe 70 is connected between an upper extent of a front face of the bag and the second opening of the snow blower. The pipe thus serves for receiving and storing the material received therefrom. It should be noted that prior to the aforementioned pipe being retrofitted, an outlet snow thrower must be removed from the snow blower.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A snow blower and leave collector system comprising, in combination:

a snow blower including an intermediate motor assembly having a pair of tracks mounted on opposite side faces thereof, a pair of handle bars coupled to the side faces of the intermediate motor assembly and extending upwardly and rearwardly therefrom with handle grips formed on top ends thereof, a shield including a rear face with a semi-cylindrical configuration mounted to a front face of the intermediate motor assembly and a pair of semicircular side faces for defining an open front and an open bottom, a drive shaft coupled to the intermediate motor assembly and extending forwardly therefrom through the shield, a control assembly mounted between the top ends of the handle bars for selectively rotating the drive shaft at a selected speed and controlling the tracks, a plurality of tines mounted on a cross bar which is rotatably mounted between the side faces of the shield and operatively coupled to the drive shaft for rotating coincidentally therewith, wherein a first opening is formed in the front face of the intermediate motor assembly which is in communication with a second opening formed in a top face of the intermediate motor assembly such that material may be collected by the tines and directed from the first opening to the second opening;

a squirrel cage including an annular ring with a periphery having a plurality of rectangular cut outs formed therein each of which is defined by a pair of elongated side edges and a pair of short end edges, a plurality of planar rectangular blades each integrally coupled along a central extent thereof to one of the elongated side edges of one of the cut outs such that outboard sharpened edges of the blades are angled outwardly, and a central sleeve connector with a radially extending set screw for allowing the squirrel cage to be removably connected to the drive shaft in concentric relationship between the shield and the tines of the snow blower;

a mulcher blade including an elongated planar rectangular strip with a pair of opposing elongated sharpened edges which flare outwardly in opposite directions, the mulcher blade having a central sleeve connector with a radially extending set screw for allowing the mulcher blade to be removably connected to the drive shaft in concentric relationship between the squirrel cage and the tines of the snow blower;

a cover including a front face with a semi-cylindrical configuration, a pair of semicircular side faces, and a horizontally oriented planar rectangular lower lip integrally coupled along a lower edge of the front face of the cover, the cover adapted for being removably attached to the shield for completely enclosing the tines, the lower lip having an elongated opening formed along a length thereof, the cover further including a hollow interior formed between a front surface and a rear surface of the front face and lower lip of the cover and in communication with a slot formed in the front surface of the front face of the cover and further in communication with the opening of the lower lip of the cover, wherein a flexible shutter is slidably mounted within the hollow interior of the cover with an upper tab extending from the slot for allowing a user to selectively close the opening formed in the lower lip of the cover;

a vacuum assembly including a bellowed hose having a first end removably coupled to a bore formed in a central extent of the front face of the cover and a second end with an elongated laterally extending inlet mounted thereon, wherein an elongated linear handle is fixedly mounted on the inlet and extends upwardly therefrom for maneuvering by a user; and a bag removably mounted below the control assembly of the snow blower with a pipe connected between an upper extent of a front face of the bag and the second opening of the snow blower for receiving and storing the material received therefrom.

2. A snow blower converter kit adapted for use with a snow blower including an intermediate motor assembly having a pair of ground traction assemblies mounted on opposite side faces thereof, at least one handle bar coupled to the intermediate motor assembly, a shield mounted to a front face of the intermediate motor assembly, a drive shaft coupled to the intermediate motor assembly and extending forwardly therefrom through the shield, a control assembly for selectively rotating the drive shaft, and a plurality of tines mounted on a cross bar which is rotatably mounted on the shield and operatively coupled to the drive shaft for rotating coincidentally therewith, wherein a conduit is positioned adjacent the tines for directing collected material therefrom, the kit comprising:

a mulcher blade adapted for being removably mounted on the drive shaft in concentric relationship therewith between the conduit and the tines of the snow blower;

a cover adapted for being removably mounted on the shield with a slot formed in a lower portion thereof for accepting the material therethrough; and a squirrel cage with a plurality of cut outs formed therein each having an angled blade extending therefrom, wherein the squirrel cage is mounted on the drive shaft adjacent the mulcher blade.

3. A snow blower converter kit as set forth in claim 2 wherein a flexible hose is removably mounted on the cover and has an inlet for collecting the collected material.

4. A snow blower converter kit as set forth in claim 3 wherein the slot is selectively covered via a shutter.

5. A snow blower converter kit as set forth in claim 2 and further including a bag adapted for being removably mounted to the snow blower for receiving the material from the conduit and storing the same.

\* \* \* \* \*